United States Patent
Suda et al.

(10) Patent No.: US 7,730,877 B2
(45) Date of Patent: Jun. 8, 2010

(54) FUEL TANK STRUCTURE

(75) Inventors: Touru Suda, Toyota (JP); Takayuki Usui, Obu (JP); Taku Masaki, Obu (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 0 days.

(21) Appl. No.: 12/347,737

(22) Filed: Dec. 31, 2008

(65) Prior Publication Data
US 2009/0178653 A1 Jul. 16, 2009

(30) Foreign Application Priority Data
Jan. 10, 2008 (JP) .............................. 2008-003549

(51) Int. Cl.
*F02M 37/04* (2006.01)
(52) U.S. Cl. .................... 123/509; 137/565.22
(58) Field of Classification Search ................. 123/509; 137/565.22, 565.23
See application file for complete search history.

(56) References Cited

U.S. PATENT DOCUMENTS

| | | | | |
|---|---|---|---|---|
| 6,505,644 B2 * | 1/2003 | Coha et al. | ............. | 137/565.22 |
| 6,907,899 B2 * | 6/2005 | Yu et al. | ................. | 137/565.22 |
| 7,303,378 B2 * | 12/2007 | Kleppner et al. | .............. | 417/87 |
| 2002/0031431 A1 * | 3/2002 | Akiyama et al. | ............ | 417/198 |
| 2004/0219029 A1 * | 11/2004 | Kleppner et al. | .............. | 417/77 |
| 2005/0183781 A1 * | 8/2005 | Vitalis et al. | ........... | 137/565.22 |

FOREIGN PATENT DOCUMENTS

| | | |
|---|---|---|
| JP | 7304340 | 11/1995 |
| JP | 2006266230 | 10/2006 |
| JP | 2006316701 | 11/2006 |
| JP | 2007218094 | 8/2007 |

\* cited by examiner

*Primary Examiner*—Stephen K Cronin
*Assistant Examiner*—Arnold Castro
(74) *Attorney, Agent, or Firm*—Marshall, Gerstein & Borun LLP

(57) ABSTRACT

A main suction, that is a portion of a fuel feed-out pipe, and a bent portion, that is a lowermost portion formed at a return pipe, are both disposed within a fuel tank, positioned lower than a lowest liquid surface within a reserve cup, and can always be maintained in a state of existing within fuel. A fuel expelling port of a jet pump is positioned higher than a highest liquid surface at the reserve cup, and is always positioned higher than fuel within the reserve cup. As a result, a fuel tank structure in which suppression of flowing-out of fuel from the return pipe and the like, an improvement in the fuel transferring performance of the jet pump, and suppression of backward flowing of fuel through a transfer pipe, can all be realized is obtained.

10 Claims, 4 Drawing Sheets

FUEL TANK STRUCTURE

CROSS-REFERENCE TO RELATED APPLICATIONS

This application claims priority under 35 USC 119 from Japanese Patent Application No. 2008-003549, the disclosure of which is incorporated by reference herein.

BACKGROUND OF THE INVENTION

1. Field of the Invention

The present invention relates to a fuel tank structure that is provided in a vehicle such as an automobile or the like.

2. Description of the Related Art

As a fuel tank structure that is provided in a vehicle such as an automobile or the like, Japanese Patent Application Laid-Open (JP-A) No. 7-304340 discloses a structure in which a jet pump is provided at a first tank portion of a saddle-shaped fuel tank. In this structure, negative pressure is applied to the interior of the jet pump by fuel that is returned from an engine through a return pipe. Fuel is sent to the jet pump from a second tank portion due to the negative pressure.

However, in the fuel tank structure disclosed in JP-A No. 7-304340, because the discharge opening (exit pipe) of the fuel from the jet pump is positioned within fuel, there is resistance to the expelling of the fuel, and the fuel transferring ability of the jet pump is low.

In order to overcome such a drawback, it has been thought to place the jet pump above, and to position the fuel discharge opening above the liquid surface. However, when the fuel discharge opening of the jet pump is positioned above the liquid surface, air enters-in from the fuel discharge opening of the jet pump at times when fuel is no longer returned from the engine. Therefore, there is the concern that the phenomenon of the fuel within the return pipe or the like flowing-out (so-called fuel flow-out) will arise.

Further, in the structure of JP-A No. 7-304340, when, fuel from the engine is no longer returned in a state in which, for example, the liquid level of a first tank chamber is higher than the liquid level of a second tank chamber, there is the concern that, due to the difference in heights in the first tank chamber and the second tank chamber, the phenomenon will arise that the fuel in the first tank chamber flows backward to the second tank chamber through a transfer pipe (suction pipe).

SUMMARY OF THE INVENTION

In view of the above, the present invention provides a fuel tank structure that can realize all of suppression of flowing-out of fuel from a return pipe or the like, improvement in the fuel transferring performance of a jet pump, and suppression of backward flowing of fuel through a transfer pipe.

A fuel tank structure of a first aspect of the present invention includes: a fuel accommodating portion that accommodates fuel; a fuel feed-out pipe having, within the fuel accommodating portion, a fuel suction opening for feeding fuel from the fuel accommodating portion out to an exterior; a fuel flow-in pipe communicating with the fuel feed-out pipe, and causing fuel to flow into the fuel accommodating portion; a jet pump disposed within the fuel accommodating portion and to which a fuel discharge opening of the fuel flow-in pipe is connected, the jet pump able to transfer fuel from a region other than the fuel flow-in pipe by utilizing negative pressure of fuel that flows-in from the fuel flow-in pipe; and a fuel transfer pipe, connected to the jet pump, for transferring fuel from a region other than the fuel flow-in pipe by the negative pressure, wherein a portion of the fuel feed-out pipe and a portion of the fuel flow-in pipe are positioned lower than a lowest liquid surface of fuel that is set at the fuel accommodating portion, and a fuel expelling port of the jet pump is positioned at a height that is greater than or equal to a highest liquid surface of fuel that is set at the fuel accommodating portion.

In this fuel tank structure, the fuel of the fuel accommodating portion is fed-out from the fuel suction opening through the fuel feed-out pipe to the exterior, e.g., an engine. The fuel feed-out pipe communicates with the fuel flow-in pipe, and fuel from the exterior flows-in (is made to return) into the fuel accommodating portion as return fuel. The fuel discharge opening of the fuel flow-in pipe is connected to the jet pump. When return fuel flows-in from the fuel flow-in pipe to the jet pump, negative pressure is generated within the jet pump. Due to this negative pressure, the jet pump can further transfer the fuel through the fuel transfer pipe from a region other than the fuel flow-in pipe.

Here, in the fuel tank of the first aspect of the present invention, a portion of the fuel feed-out pipe and a portion of the fuel flow-in pipe are positioned lower than the lowest liquid surface of fuel that is set at the fuel accommodating portion. This "lowest liquid surface" is, for example, the liquid surface of the fuel that is a threshold value in a case in which the remaining amount of fuel becomes low and fueling is urged. The liquid surface of the fuel in a usual state is positioned higher than this lowest liquid surface. In other words, a portion of the fuel feed-out pipe and a portion of the fuel flow-in pipe always exist within the fuel. Accordingly, even in a state in which feeding-out of fuel from the fuel accommodating portion through the fuel feed-out pipe, or flowing-in of fuel through the fuel flow-in pipe to the fuel accommodating portion, stops, air does not enter into the fuel feed-out pipe nor into the fuel flow-in pipe. Therefore, inadvertent flowing-out of the fuel within the fuel feed-out pipe and within the fuel flow-in pipe, or so-called fuel flow-out, can be suppressed.

Further, in the fuel tank structure of the first aspect of the present invention, the fuel expelling port of the jet pump is positioned in a vicinity of the highest liquid surface of fuel that is set at the fuel accommodating portion, or at a height that greater than or equal to the highest liquid surface. This "highest liquid surface" is a liquid surface that is a threshold value that the liquid surface of the fuel does not exceed, even when the maximum amount of fuel is accommodated in the fuel accommodating portion. Further, a "vicinity" of the highest liquid surface is a region of an extent that, even if the fuel expelling port of the jet pump is lower than the highest liquid surface, the resistance that is applied to the expelling of fuel from the fuel expelling port of the jet pump is sufficiently small in consideration of the fuel transferring performance of the jet pump. Namely, if the fuel expelling port of the jet pump is positioned lower than the highest liquid surface, in the state in which the fuel liquid surface approaches the fuel expelling port, the fuel expelling port is immediately immersed in the fuel that is drawn up, and the effect of reducing resistance at the time of expelling fuel from the fuel expelling port decreases. Therefore, it is preferable that the fuel expelling port of the jet pump be positioned as near as possible to the highest liquid surface, or at a height that is greater than or equal to the highest liquid surface. Further, even if the fuel expelling port of the jet pump is beneath the highest liquid surface, if it is set sufficiently close to the highest liquid surface, resistance to the expelling of fuel from the fuel expelling port substantially does not arise (or, even if resistance arises, it is of an extent that is not problematic). Such a range is a "vicinity" of the highest liquid surface. Accordingly, the fuel expelling port of the jet pump is either always positioned above the fuel, or, even if it is positioned within the fuel, it is positioned in a range such that resistance to the expelling of fuel from the fuel expelling port does not arise (or, even if resistance arises, it does not cause problems). Therefore, as compared with a structure in which the fuel expelling port of the jet pump is positioned lower than a vicinity of the highest liquid surface, the resistance to expelling at the time of expelling the fuel is low, and the fuel transferring performance of the jet pump can be improved.

Further, in a structure in which the fuel expelling port of the jet pump is disposed at a height that is greater than or equal to the highest liquid surface, the fuel expelling port is always positioned above the fuel and within gaseous matter. Moreover, also in a structure in which the fuel expelling port of the jet pump is disposed in a vicinity of the highest liquid surface, even if the fuel expelling port is temporarily immersed, this immersion is eliminated immediately, and the fuel expelling port is positioned higher than the fuel and in gaseous matter. Thus, at times when transfer of fuel by the jet pump is not being carried out, gaseous matter enters into the fuel transfer pipe. Due thereto, the phenomenon of fuel inadvertently flowing backward through the fuel transfer pipe can be suppressed.

In the fuel tank structure of the first aspect of the present invention, the fuel accommodating portion is a reserve cup that can store fuel temporarily, and the jet pump may transfer fuel from an exterior of the reserve cup to an interior of the reserve cup.

Accordingly, fuel is stored within the reserve cup, and the stored fuel can be fed-out to the exterior through the fuel feed-out pipe. Further, the return fuel, that flows-in through the fuel flow-in pipe, can be made to flow into the reserve cup. In addition, by transferring fuel from the exterior of the reserve cup to the interior by utilizing the negative pressure that is generated at the jet pump by the return fuel, the fuel within the reserve cup can be ensured more reliably.

Because the present invention is structured as described above, suppression of flowing-out of fuel from the return pipe and the like, an improvement in the fuel transferring performance of the jet pump, and suppression of backward flowing of fuel through the transfer pipe, can all be realized.

DETAILED DESCRIPTION OF THE INVENTION

Figure 1:
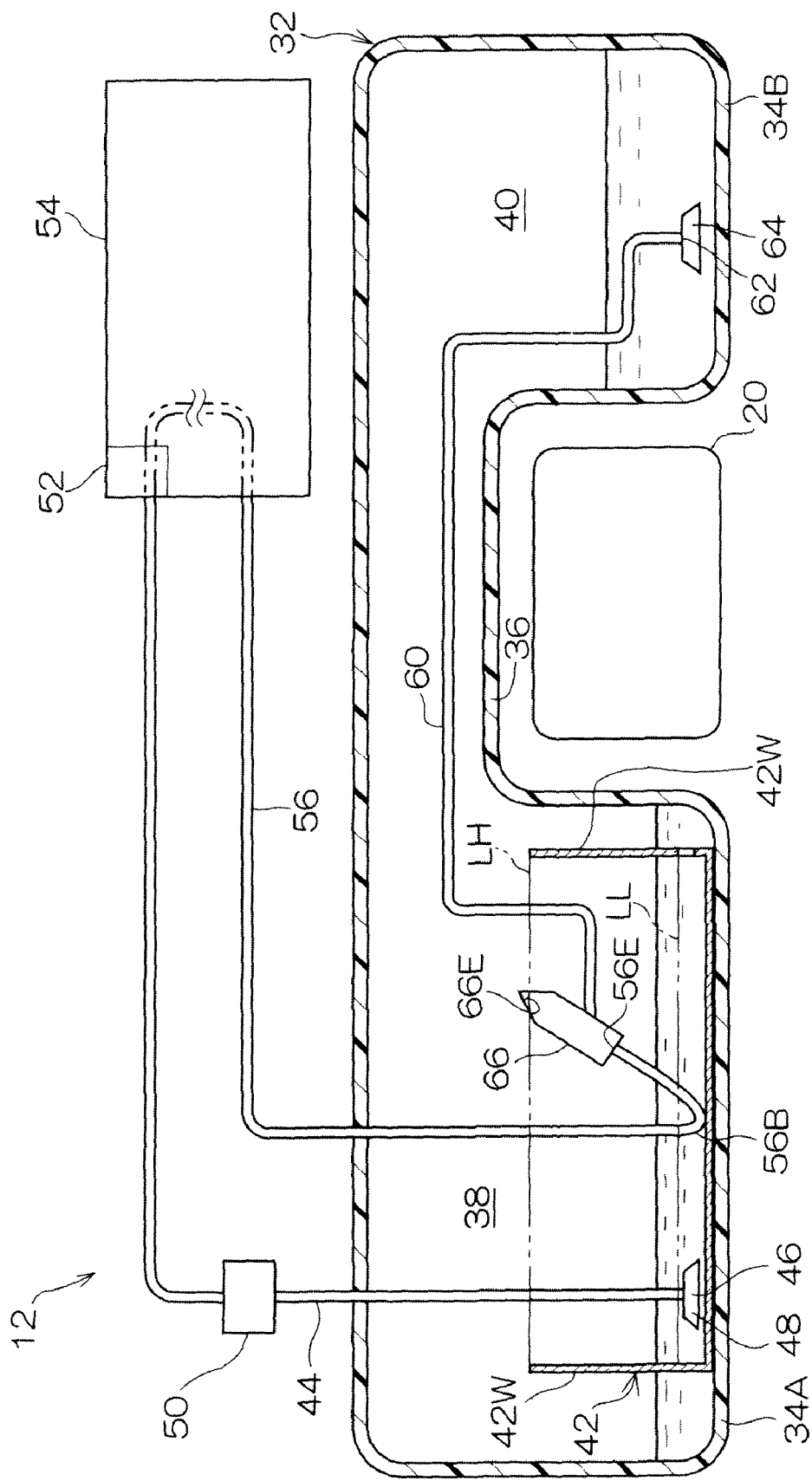
FIG. 1 is a schematic structural drawing showing a fuel tank structure of a first exemplary embodiment of the present invention.

A fuel tank structure 12 of a first exemplary embodiment of the present invention is shown in FIG. 1. A vehicle in which this fuel tank structure 12 is provided has, at the substantially center in a vehicle transverse direction, a transaxle 20 that extends in a vehicle longitudinal direction. Further, for example, a heat insulator, an exhaust pipe, and the like that are not illustrated are disposed therebeneath. The fuel tank structure 12 is disposed above the transaxle 20, so as to straddle the transaxle 20.

The fuel tank structure 12 has a fuel tank main body 32 in which fuel is accommodated. Two low position portions 34A, 34B at both sides of the transaxle 20, and a high position portion 36 that is positioned above the transaxle 20 at a position that is relatively higher than the low position portions 34A, 34B, are formed at the floor portion of the fuel tank main body 32. Namely, the fuel tank main body 32 is a saddle-shaped fuel tank in which the low position portions 34A, 34B are formed at the both sides of the single high position portion 36, and that has, on the whole, a main chamber 38 and an auxiliary chamber 40. Note that an unillustrated filler pipe is provided at the upper portion of the main chamber 38 such that fueling to the main chamber 38 can be carried out.

A box-shaped reserve cup 42 whose top surface is open is disposed within the main chamber 38. The lower portion of a fuel feed-out pipe 44 is positioned in a vicinity of the floor portion of the reserve cup 42. One end (the lower end) of the fuel feed-out pipe 44 is a main suction 46 that is equipped with a filter 48. A suction pump 52 is connected to the other end (the upper end) via a fuel filter 50. Further, a fuel supply pipe is connected to the suction pump 52, and the fuel within the main chamber 38 can be supplied to an engine 54 or the like due to the driving of the suction pump 52.

The upper end of a return pipe 56 is connected to the suction pump 52, and the lower end of the return pipe 56 is positioned within the reserve cup 42. The fuel feed-out pipe 44 communicates with the return pipe 56. A portion of the fuel that is sucked by the suction pump 52 is returned to the interior of the reserve cup 42 through the return pipe 56.

An intermediate portion of the return pipe 56 is positioned in a vicinity of the floor portion of the reserve cup 42, and at this portion, the return pipe 56 is bent at an acute angle such that a lowermost portion 56B is formed. The other end of the return pipe 56 is a fuel discharge opening 56E, and reaches substantially the same position as the upper end of a peripheral wall 42W of the reserve cup 42. Further, a jet pump 66 is attached to the fuel discharge opening 56E at this other end of the return pipe 56.

Here, in the present invention, the main suction 46, that is a portion of the fuel feed-out pipe 44, and the lowermost portion 56B, that is a portion of the return pipe 56, are both positioned beneath a lowest liquid surface LL at the reserve cup 42. This "lowest liquid surface" is the liquid surface that is a threshold value in a case in which the remaining amount of fuel within the reserve cup 42 becomes low, and, for example, a fuel lamp (not shown) is lit so as to urge fueling. Accordingly, usually, traveling does not continue in a state in which the actual fuel liquid surface becomes lower than this lowest liquid surface (a state in which there is little fuel). By disposing the main suction 46 and the lowermost portion 56B lower than this lowest liquid surface, a portion of the fuel feed-out pipe 44 and a portion of the return pipe 56 can always be maintained in a state of existing within the fuel.

In the present exemplary embodiment, a fuel expelling port 66E of the jet pump 66 is positioned above a highest liquid surface LH at the reserve cup 42. This "highest liquid surface" is the liquid surface at the time when the greatest amount of fuel is stored within the reserve cup 42, and, in the present exemplary embodiment, is the same height as the upper end of the peripheral wall 42W of the reserve cup 42. Accordingly, the fuel expelling port 66E of the jet pump 66 is always positioned above the fuel within the reserve cup 42. Of course, the position (height) of the highest liquid surface LH can be set arbitrarily at a position that is lower than the upper end of the peripheral wall 42W of the reserve cup 42, by, for example, forming a fuel flow-out hole in the peripheral wall 42W of the reserve cup 42, or the like.

A fuel transfer pipe 60 is disposed between the auxiliary chamber 40 and the main chamber 38 (the interior of the reserve cup 42). One end of the fuel transfer pipe 60 is a sub-suction 62 that is equipped with a filter 64, and is positioned in a vicinity of the floor portion of the auxiliary chamber 40. Further, the fuel transfer pipe 60 is bent at predetermined positions, and the other end thereof is connected to the jet pump 66 at an upper portion of the interior of the reserve cup 42. When return fuel is passed-through the jet pump 66, negative pressure acts on the jet pump 66. Therefore, due to this negative pressure, fuel can be transferred through the fuel transfer pipe 60 from the auxiliary chamber 40 to the main chamber 38 (the interior of the reserve cup 42).

In the fuel tank structure 12 of the present exemplary embodiment that is structured in this way, the fuel within the main chamber 38 (the reserve cup 42) is fed-out to an unillustrated engine or the like by the driving of the suction pump 52. Further, a portion of the fuel at this time can be returned, as return fuel, to the interior of the main chamber (the reserve cup 42) through the return pipe 56.

Because negative pressure is generated at the jet pump 66 by the return fuel, due to this negative pressure, fuel is transferred from the auxiliary chamber 40 to the main chamber 38 (the interior of the reserve cup 42) through the fuel transfer pipe 60.

Figure 2:
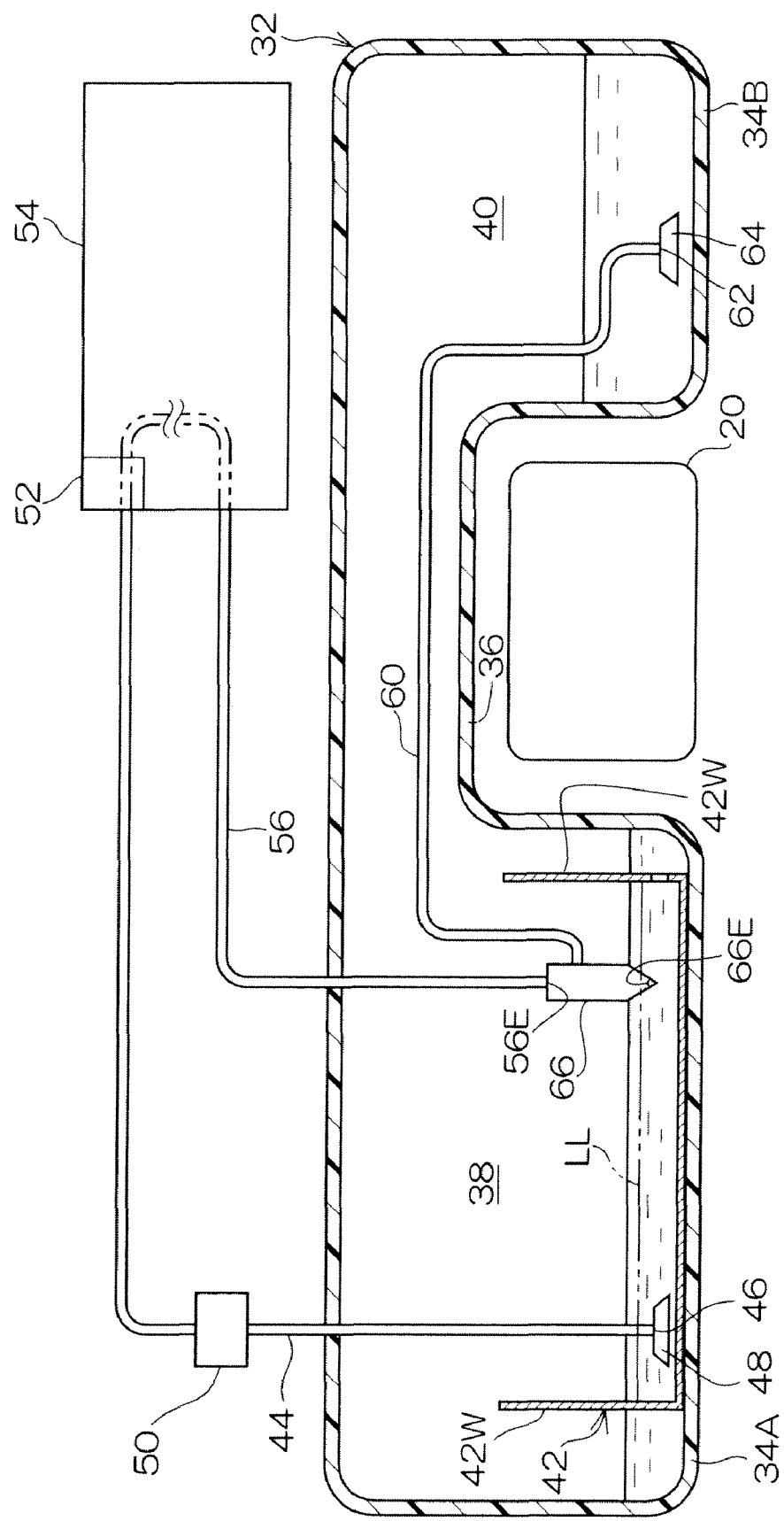
FIG. 2 is a schematic structural drawing showing a fuel tank structure of a first comparative example.

In the present exemplary embodiment, the fuel expelling port 66E of the jet pump 66 is positioned higher than the highest liquid surface LH of the reserve cup 42, and is always positioned within the gaseous matter of the fuel tank main body 32. Here, a structure in which the fuel expelling port 66E of the jet pump 66 is disposed lower than the lowest liquid surface LL of the reserve cup 42 is illustrated in FIG. 2 as a first comparative example. (In the first comparative example, portions other than these have the same structures as in the present exemplary embodiment, and therefore, the same reference numerals are applied thereto and description thereof is omitted.) In the first comparative example, the fuel expelling port 66E is always in a state of being positioned within the fuel. When the fuel expelling port 66E is positioned within the fuel in this way, the resistance (pressure loss) at the time of discharging fuel is large. However, in the present exemplary embodiment, the resistance at the time of discharging fuel is low in comparison. Therefore, the fuel transferring performance of the jet pump 66 can be improved.

In a case such as, for example, when driving of an unillustrated engine stops or the like, fuel is no longer returned to the interior of the reserve cup 42 through the return pipe 56. At this time, in the present invention, due to the main suction 46 of the fuel feed-out pipe 44 and the lowermost portion 56B of the return pipe 56 being disposed lower than the lowest liquid surface as shown in FIG. 1, a portion of the fuel feed-out pipe 44 and a portion of the return pipe 56 always exist within the fuel. Accordingly, even in cases in which return fuel is no longer returned from the engine, gaseous matter does not inadvertently flow-in into the fuel feed-out pipe 44 and the return pipe 56.

Figure 3:
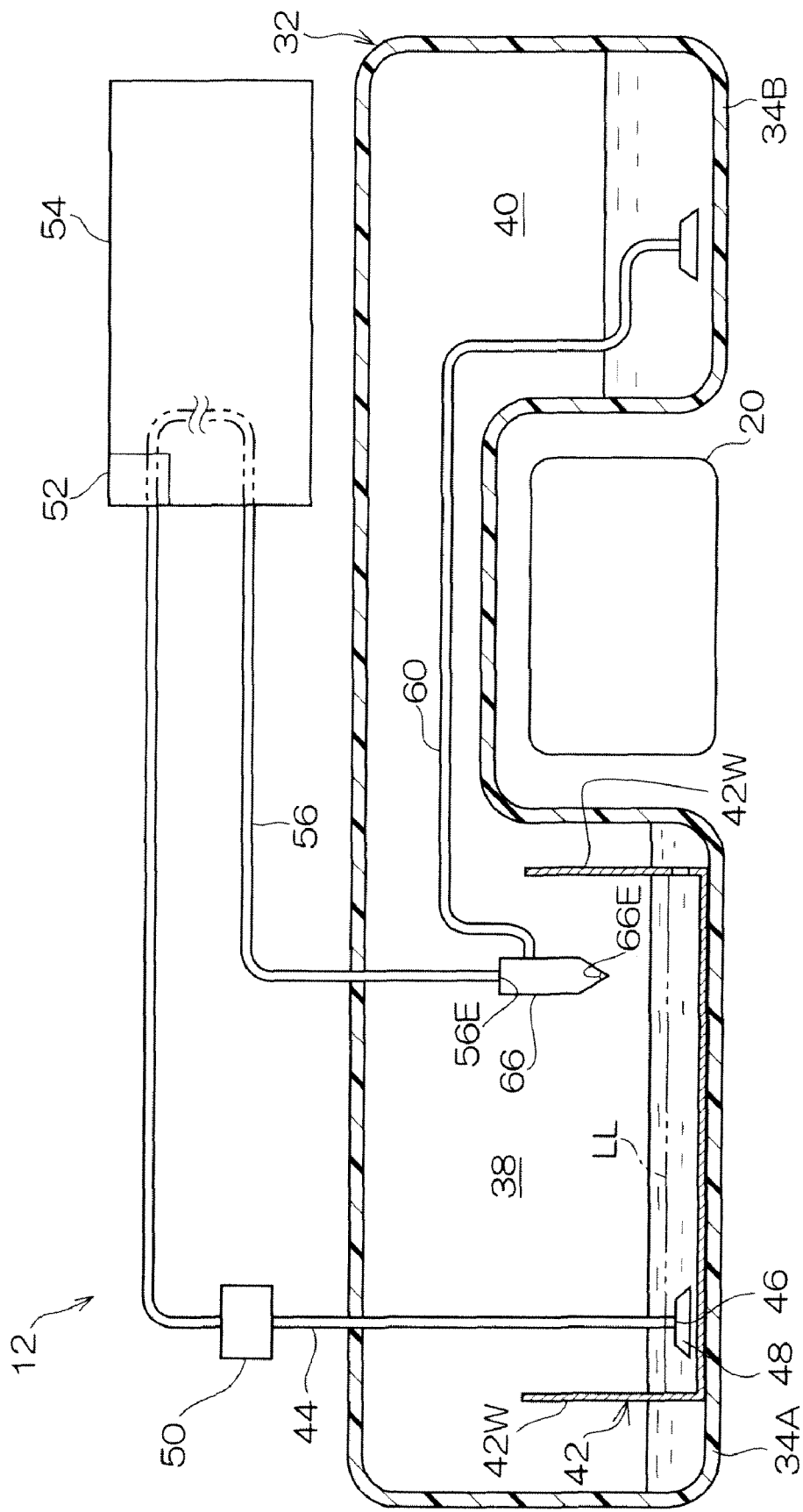
FIG. 3 is a schematic structural drawing showing a fuel tank structure of a second comparative example.

A structure in which a bent portion positioned at the lowermost region is not formed at the return pipe 56 and the entire return pipe 56 is positioned higher than the lowest liquid surface LL, is shown in FIG. 3 as a second comparative example. (In the second comparative example as well, portions other than these have the same structures as in the present exemplary embodiment, and therefore, the same reference numerals are applied thereto and description thereof is omitted.) In the second comparative example, the fuel expelling port 66E of the jet pump 66 also is positioned within gaseous matter, and therefore, when fuel is no longer returned to the interior of the reserve cup 42 through the return pipe 56, gaseous matter flows-in into the return pipe 56 from the fuel expelling port 66E. Because the return pipe 56 and the fuel feed-out pipe 44 communicate, there is the concern that the fuel of the return pipe 56 and the fuel feed-out pipe 44 will flow-out due to the gaseous matter that flows-in.

In contrast, in the present exemplary embodiment, as described above, even in cases in which return fuel is no longer returned from the engine, gaseous matter does not inadvertently flow-in into the fuel feed-out pipe 44 and the return pipe 56. Thus, flowing-out of fuel from the return pipe 56 and the fuel feed-out pipe 44 can be suppressed.

Further, in a state in which fuel is no longer returned to the interior of the reserve cup 42 through the return pipe 56, negative pressure does not arise at the jet pump 66, and therefore, fuel is not transferred from the auxiliary chamber 40 to the main chamber 38. At this time, if, for example, the liquid surface of the main chamber 38 is higher than the liquid surface of the auxiliary chamber 40, or the like, there are cases in which fuel flows backward from the main chamber 38 to the auxiliary chamber 40 due to the principles of so-called siphoning.

However, in the present exemplary embodiment, the fuel expelling port 66E of the jet pump 66 is positioned higher than the highest liquid surface LH of the reserve cup 42, and is always positioned within the gaseous matter of the fuel tank main body 32. Therefore, in a state in which negative pressure is not acting on the jet pump 66, gaseous matter flows-in from the fuel expelling port 66E to the fuel transfer pipe 60. In this way, fuel does not flow backward from the main chamber 38 to the auxiliary chamber 40.

Figure 4:
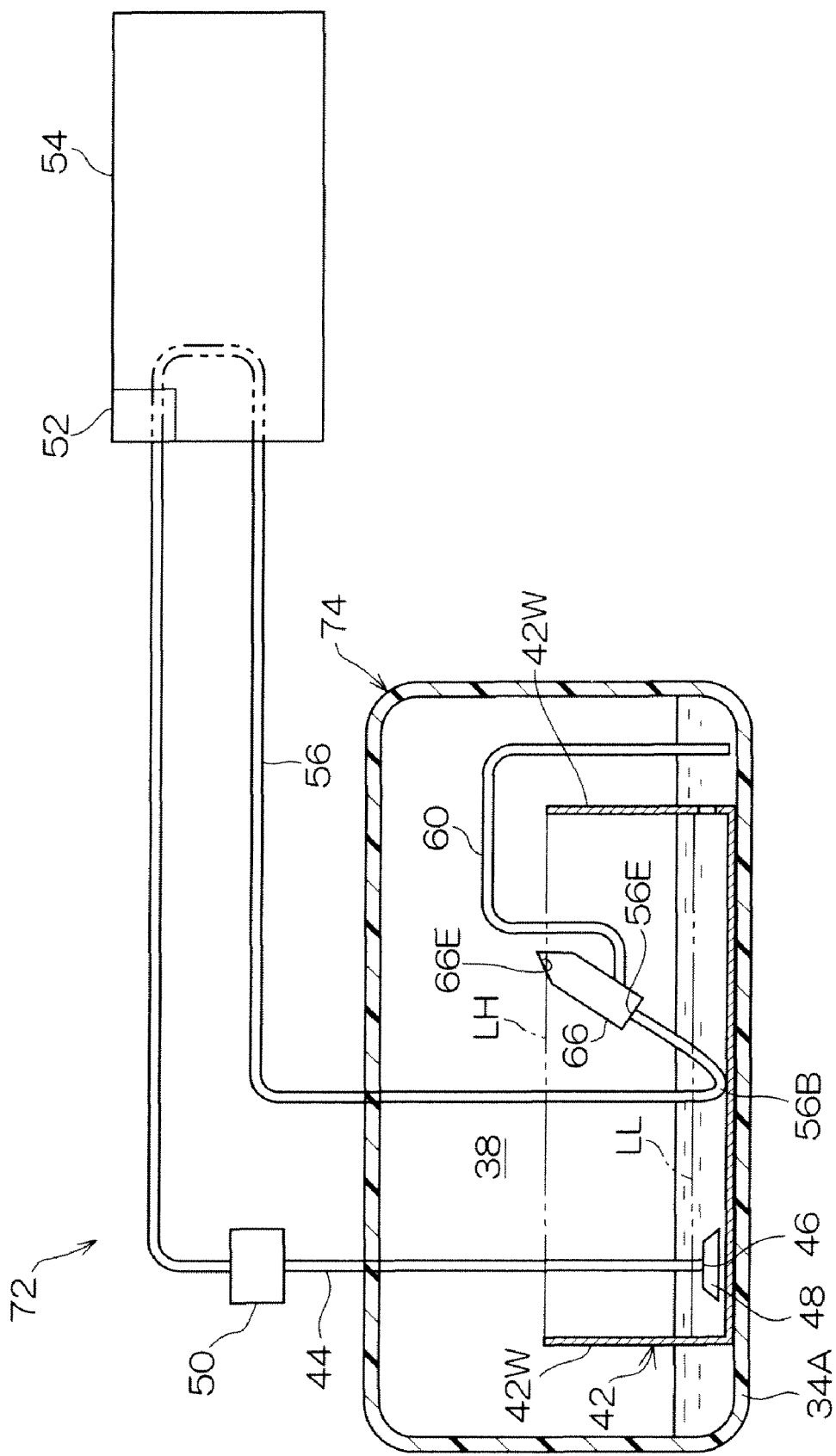
FIG. 4 is a schematic structural drawing showing a fuel tank structure of a second exemplary embodiment of the present invention.

The above description gives an example in which a so-called saddle-shaped tank is used as the structure of the fuel tank main body 32. However, the object to which the present invention is applied is not limited to a saddle-shaped tank. FIG. 4 illustrates, as a second exemplary embodiment of the present invention, an example in which a fuel tank structure 72 of the present invention is applied to a structure that utilizes the negative pressure of the jet pump 66 in order to transfer fuel from the exterior to the interior of the reserve cup 42 within the main chamber 38, at a fuel tank main body 74 having only the main chamber 38. In the second exemplary embodiment, portions other than these have the same structures as in the first exemplary embodiment, and the same reference numerals are applied thereto and description thereof is omitted.

Further, the present invention can be applied also to, for example, a fuel tank whose interior is partitioned into a main chamber and an auxiliary chamber by a partitioning wall, and fuel is transferred by a fuel transfer pipe from the auxiliary chamber to the main chamber. Moreover, in a so-called dual tank that is a fuel tank of a structure in which a main chamber and an auxiliary chamber are separated completely and are connected by a fuel transfer pipe, if it is a structure that transfers fuel from one fuel accommodating portion to another fuel accommodating portion, the fuel tank structure of the present invention may be applied to the fuel accommodating portion at the side that the fuel flows into.

In addition, the above-described exemplary embodiments give examples in which the fuel expelling port 66E of the jet pump 66 is disposed higher than the highest liquid surface LH. However, even if the fuel expelling port 66 is the same height as the highest liquid surface LH or is lower than the highest liquid surface LH, it suffices for the fuel expelling port 66E to be in a vicinity of the highest liquid surface LH such that the resistance that is applied to the expelling of the fuel from the fuel expelling port 66E is sufficiently low in consideration of the fuel transferring performance of the jet pump 66. Namely, even if the fuel expelling port 66E of the jet pump 66 is beneath the highest liquid surface LH, if it is set sufficiently close to the highest liquid surface, resistance to the expelling of the fuel from the fuel expelling port 66E substantially does not arise (or, even if it does arise, it is of an extent that is not problematic). Further, in a structure in which the fuel expelling port 66E of the jet pump 66 is disposed at the same height as the highest liquid surface LH or in a vicinity of the highest liquid surface LH, it can be assumed that the fuel expelling port 66E will be immersed temporarily, but this immersion is immediately eliminated, and therefore, the fuel expelling port 66E is positioned in the gaseous matter above the fuel. Thus, in the same way as a structure in which the fuel expelling port 66E is disposed above the highest liquid surface LH, gaseous matter enters into the fuel transfer pipe 60 when transfer of fuel by the jet pump 66 is not being carried out, and therefore, the phenomenon of fuel inadvertently flowing backward through the fuel transfer pipe 60 can be suppressed.

From the standpoint of making small the resistance to the expelling of fuel from the fuel expelling port 66E of the jet pump 66, and from the standpoint of causing gaseous matter to flow-in into the fuel transfer pipe 60 at times when transfer of fuel by the jet pump 66 is not being carried out, no marked difference arises in particular in the effects if, for example, the fuel expelling port 66E is higher than the highest liquid surface LH. However, in consideration of managing the actual members, and the like, it is preferable that the fuel expelling port 66E be positioned close to the highest liquid surface LH even if it is above the highest liquid surface LH.

What is claimed is:

1. A fuel tank structure comprising:
a fuel accommodating portion that accommodates fuel;
a fuel feed-out pipe having, within the fuel accommodating portion, a fuel suction opening for feeding fuel from the fuel accommodating portion out to an exterior;
a fuel flow-in pipe communicating with the fuel feed-out pipe, and causing fuel to flow into the fuel accommodating portion;
a jet pump disposed within the fuel accommodating portion and to which a fuel discharge opening of the fuel flow-in pipe is connected, the jet pump able to transfer fuel from a region other than the fuel flow-in pipe by utilizing negative pressure of fuel that flows-in from the fuel flow-in pipe; and
a fuel transfer pipe, connected to the jet pump, for transferring fuel from a region other than the fuel flow-in pipe by the negative pressure,
wherein a portion of the fuel feed-out pipe and a portion of the fuel flow-in pipe are positioned lower than a lowest liquid surface of fuel that is set at the fuel accommodating portion, and a fuel expelling port of the jet pump is positioned at a height that is greater than or equal to a highest liquid surface of fuel that is set at the fuel accommodating portion.

2. The fuel tank structure of claim 1, wherein the fuel accommodating portion is a reserve cup that can store fuel temporarily, and the jet pump transfers fuel from an exterior of the reserve cup to an interior of the reserve cup.

3. The fuel tank structure of claim 1, wherein the portion of the fuel flow-in-pipe that is positioned lower than the lowest liquid surface of fuel that is set at the fuel accommodating portion, includes a region that is bent at an acute angle.

4. The fuel tank structure of claim 1, wherein the portion of the fuel feed-out pipe that is positioned lower than the lowest liquid surface of fuel that is set at the fuel accommodating portion, includes the fuel suction opening.

5. A fuel tank structure comprising:
a fuel accommodating portion that accommodates fuel;
a fuel feed-out pipe having, within the fuel accommodating portion, a fuel suction opening for feeding fuel from the fuel accommodating portion out to an exterior;
a fuel flow-in pipe communicating with the fuel feed-out pipe, and causing fuel to flow into the fuel accommodating portion;
a jet pump disposed within the fuel accommodating portion and to which a fuel discharge opening of the fuel flow-in pipe is connected, the jet pump able to transfer fuel from a region other than the fuel flow-in pipe by utilizing negative pressure of fuel that flows-in from the fuel flow-in pipe; and
a fuel transfer pipe, connected to the jet pump, for transferring fuel from a region other than the fuel flow-in pipe by the negative pressure,
wherein a portion of the fuel feed-out pipe and a portion of the fuel flow-in pipe are positioned lower than a lowest liquid surface of fuel that is set at the fuel accommodating portion, and a fuel expelling port of the jet pump is positioned in a vicinity of a highest liquid surface of fuel that is set at the fuel accommodating portion.

6. The fuel tank structure of claim 5, wherein the fuel accommodating portion is a reserve cup that can store fuel temporarily, and the jet pump transfers fuel from an exterior of the reserve cup to an interior of the reserve cup.

7. The fuel tank structure of claim 5, wherein the fuel expelling port of the jet pump is positioned lower than the highest liquid surface of fuel that is set at the fuel accommodating portion.

8. The fuel tank structure of claim 5, wherein the fuel expelling port of the jet pump is positioned at a height that is greater than or equal to the highest liquid surface of fuel that is set at the fuel accommodating portion.

9. The fuel tank structure of claim 5, wherein the portion of the fuel flow-in pipe that s positioned lower than the lowest liquid surface of fuel that is set at the fuel accommodating portion, includes a region that is bent at an acute angle.

10. The fuel tank structure of claim 5, wherein the portion of the fuel feed-out pipe that is positioned lower than the lowest liquid surface of fuel that is set at the fuel accommodating portion, includes the fuel suction opening.

* * * * *